United States Patent [19]

Sugiyama

[11] Patent Number: 5,005,435

[45] Date of Patent: Apr. 9, 1991

[54] PINION SHIFT LEVER STARTER WITH WATERPROOF BOAT

[75] Inventor: Takeshi Sugiyama, Himeji, Japan

[73] Assignee: Mitsubishi Denki Kabushiki Kaisha, Tokyo, Japan

[21] Appl. No.: 466,791

[22] Filed: Jan. 18, 1990

[30] Foreign Application Priority Data

Jan. 19, 1989 [JP] Japan .................................... 1-12789

[51] Int. Cl.[5] ......................... F02N 15/00; F16J 15/00

[52] U.S. Cl. ........................................ 74/7 A; 74/7 R; 74/566; 277/212 C; 277/212 FB

[58] Field of Search .................... 74/6, 7 R, 7 A, 566; 290/38 C, 48; 277/212 C, 212 FB

[56] References Cited

U.S. PATENT DOCUMENTS 2,305,265 5/1942 Le Tourneau ................ 277/212 FB
4,166,520 9/1979 Baker et al. .............. 277/212 FB X
4,362,065 12/1982 Baratti ................................. 74/7 A
4,522,414 6/1985 Schulte ..................... 277/212 FB X
4,718,290 1/1988 Murata et al. ........................ 74/7 A

FOREIGN PATENT DOCUMENTS 61-38160 2/1986 Japan ..................................... 290/48
63-71474 5/1988 Japan .

*Primary Examiner*—Allan D. Herrmann
*Assistant Examiner*—David W. Laub
*Attorney, Agent, or Firm*—Sughrue, Mion, Zinn, Macpeak and Seas

[57] ABSTRACT

A starter of magnetic pinion shift type wherein a waterproofing boot 21 is provided on a shift lever 8 for shifting a pinion slidably fitted into an output rotary shaft of a motor provided for an engine of a vehicle to waterproof an electro-magnetic switch 5 disposed below the motor.

7 Claims, 5 Drawing Sheets

PINION SHIFT LEVER STARTER WITH WATERPROOF BOAT

BACKGROUND OF THE INVENTION

1. Field of the Invention

The present invention relates to a starter of the magnetic pinion shift type which shifts a pinion shifting member slidably supported on an output rotary shaft by sliding it by a shift lever connected with an electro-magnetic switch.

2. Description of Related Art

Heretofore, this type of starter has been a well known apparatus disclosed in such as Japanese Utility Model Application Laid-Open No. 63-71474 (1988). FIG. 1 is a sectional view illustrating a general configuration of this type of starter 1, and FIG. 2 is a perspective view illustrating how the parts of one portion thereof are integrated. An output rotary shaft 3 rotates according to torque of a direct current motor 2, and a pinion shifting member 4 is slidably fitted on the output rotary shaft 3. The pinion shifting member 4 is engaged with a ring gear of an engine (not shown), transmitting the torque being generated in the direct current motor 2 to the engine. Beneath the direct current motor 2, there is arranged an electro-magnetic switch 5 which slides the pinion shifting member 4 on the output rotary shaft 3 and connects a power source to the direct current motor 2. At the front end of the electro-magnetic switch 5, there are arranged a plunger 6 drawn by the electro-magnetic switch 5 and a hook 7 moving with the plunger 6. The hook 7 engages the lower end 8*a* of a shift lever 8 which slides the pinion shifting member 4 on the output rotary shaft 3. The upper end 8*b* of the shift lever 8 engages the pinion shifting member 4. The middle portion in the longitudinal direction of the shift lever 8 defines a swinging fulcrum 8*c* having roller-form projections on both sides. The front end of the starter 1 is covered with a front bracket 9. A cover 9*a* of the upper half portion of the front bracket 9 covers the front end of the direct current motor 2, and a cover 9*b* of the lower half portion covers the front end of the electro-magnetic switch 5. On the cover 9*a* of the upper half portion of the front bracket 9, there are provided, in the middle portion of the cover 9*a*, a bearing 10 supporting the front end of the output rotary shaft 3, and in the upper portion thereof, an opening 12 which opens upward so that a pinion 11 of the pinion shifting member 4 can be engaged with the ring gear of the engine in its full shifting position.

FIG. 3 is a perspective view seen from the inside of the middle portion of the front bracket 9. At a boundary between the cover 9*a* of the upper half portion and the cover 9*b* of the lower half portion of the front bracket 9, there is provided a lever box 13 which is surrounded by four walls and which has one open surface facing the inside of the starter and which houses the swinging fulcrum 8*c* of the shift lever 8 with the capability of swinging. At the upper wall 13*a* and the lower wall 13*b* of the lever box 13, there are provided notches 14 through which both arms of the shift lever 8 extend from the swinging fulcrum 8*c* toward their respective directions opposite to each other, respectively. Those arms of the shift lever 8 which have gone through those notches 14, then, go through the cover 9*a* of the upper half portion and the cover 9*b* of the lower half portion of the front bracket 9, respectively, and, as has been described above, the upper end 8*b* of the shift lever 8 engages the pinion shifting member 4, and the lower end 8*a* engages the hook 7 of the electro-magnetic switch 5. Between the front end of the electro-magnetic switch 5 and the cover 9*b* of the lower half of the front bracket 9, there is produced a space 16 for housing the shift lever 8.

A lever packing 15 comprised of a rubber plate whose front surface is coated with a steel plate is pressed onto the inner open surface 13*c* so as to close the lever box 13.

With most conventional starters the electro-magnetic switch 5 is provided in the upper portion thereof. In a vehicle in which the electro-magnetic switch 5 is provided in the lower portion of the starter as shown in FIG. 1, however, water enters from the opening 12 of the front bracket 9 which opens upward, as shwon in the arrows in FIG. 1. The water goes from internally of the cover 9*a* of the upper half portion of the front bracket 9 through the notches 14 of the lever box 13 to the space 16 formed between the cover 9*b* of the lower half potion of the front bracket 9 and the front end of the electro-magnetic switch 5. The water then, goes along the circumference of the plunger 6 and enters into the electro-magnetic switch 5, the water preventing the electro-magnetic switch 5 from performing its normal operation.

In order to prevent water from entering into the electro-magnetic switch 5, there is provided, in the lowest end of the cover 9*b* of the lower half portion of the front bracket 9, a hole 17 for draining water of a maze form which goes through windingly to the outside thereof. The hole for draining water which is provided in the lowest end of the front bracket 9, however, has a limitation in its size because of the strength of the bracket 9. Accordingly, in the case where a large amount of water enters from the opening 12 of the front bracket 9, it takes a long time until the water is completely drained from there.

Then, there exists a problem that the water filled in the space 16 of the front end of the electro-magnetic switch 5 enters into the electro-magnetic switch 5.

SUMMARY OF THE INVENTION

The foregoing problem is solved in accordance with the present invention, and the primary object of the invention is to provide a starter, wherein if water enters from an opening, which opens upward, of a front bracket, the water is not liable to enter a space for housing a shift lever formed between the front end of the electro-magnetic switch and the front bracket, thus preventing the electro-magnetic switch from being filled with water even in the case where an electro-magnetic switch is arranged in the lower portion of the starter.

The above and further objects and features of the invention will more fully be apparent from the following detailed description with accompanying drawings.

DESCRIPTION OF THE PREFERRED EMBODIMENTS

Now will be described below a starter in accordance with this invention with reference to the accompanying drawings.

Figure 4:
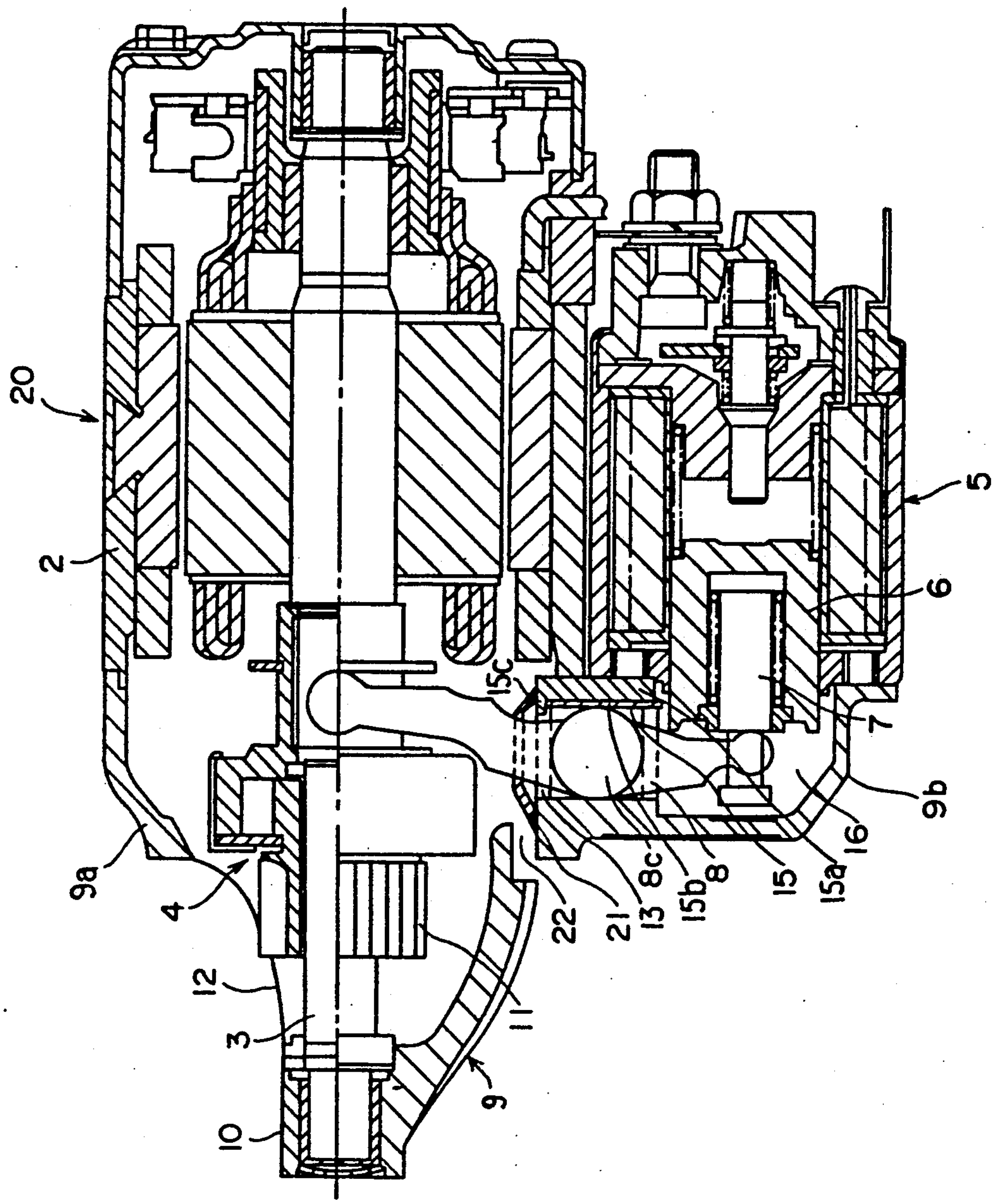
FIG. 4 is a sectional view illustrating a construction of a starter of this invention.

FIG. 4 is a sectional view illustrating a construction of one embodiment of a starter 20 of this invention. An output rotary shaft 3 rotates according to torque of a direct current motor 2, and a pinion shifting member 4 is slidably fitted on the output rotary shaft 3. The pinion shifting member 4 is engaged with a ring gear of an engine (not shown) and transmits the torque generated in the direct current motor 2 to the engine. Beneath the direct current motor 2, there is arranged an electro-magnetic switch or actuator 5 which slides the pinion shifting member 4 on the output rotary shaft 3 and gives a power source to the direct current motor 2. At the front end of the electro-magnetic switch 5, there are arranged a plunger 6 drawn by the electro-magnetic switch 5 and a hook 7 moving with the plunger 6. The lower end 8*a* of a shift lever 8 which slides the pinion shifting member 4 engages the hook 7, and the upper end 8*b* of the shift lever 8 engages the pinion shifting member 4. The middle portion in the longitudinal direction of the shift lever 8 is a swinging fulcrum 8*c* which has roller-form projections on its both sides, the shift lever 8 swinging about fulcrum 8*c*. In the vicinity of the swinging fulcrum 8*c* of the upper arm of the shift lever 8, there is mounted a waterproofing boot 21 made of rubber in the form of a square umbrella.

Figure 5:
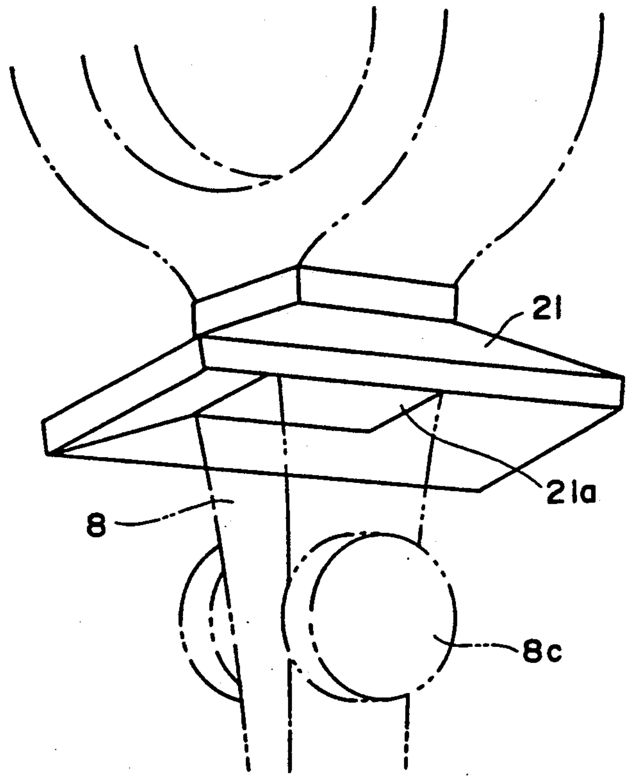
FIG. 5 is an enlarged perspective view of a waterproofing boot shown in FIG. 4.

FIG. 5 is an enlarged perspective view of the waterproofing boot 21, and the middle portion thereof is provided with an opening 21*a* of a size that the shift lever 8 can go through. And owing to elasticity of rubber, the circumference of the opening 21*a* is tightly adhered to the shift lever 8, as is the outer periphery or skirt of the waterproofing boot 21 adheaed to the upper wall 13*a* of a lever box 13 or fulcrum support, which will be described later.

The front end of the starter 20 is covered with a front bracket 9, whose upper half portion, a cover 9*a*, covers the front end of the direct current motor 2, and whose lower half portion, a cover 9*b*, covers the front end of the electro-magnetic switch 5. Under the cover 9*a* of the upper half portion of the front bracket 9, there are arranged, in its upper portion, an opening 12 which opens upward so that a pinion 11 of the pinion shifting member 4 can be engaged with a ring gear of an engine in its fully shifted position, in its middle portion, a bearing 10 for supporting the front end of the output rotary shaft 3, and in its lower portion, a drain passage 22 for draining any water in the cover 9*a* of the upper half portion of the front bracket 9 to the outside thereof, respectively.

Figure 1:
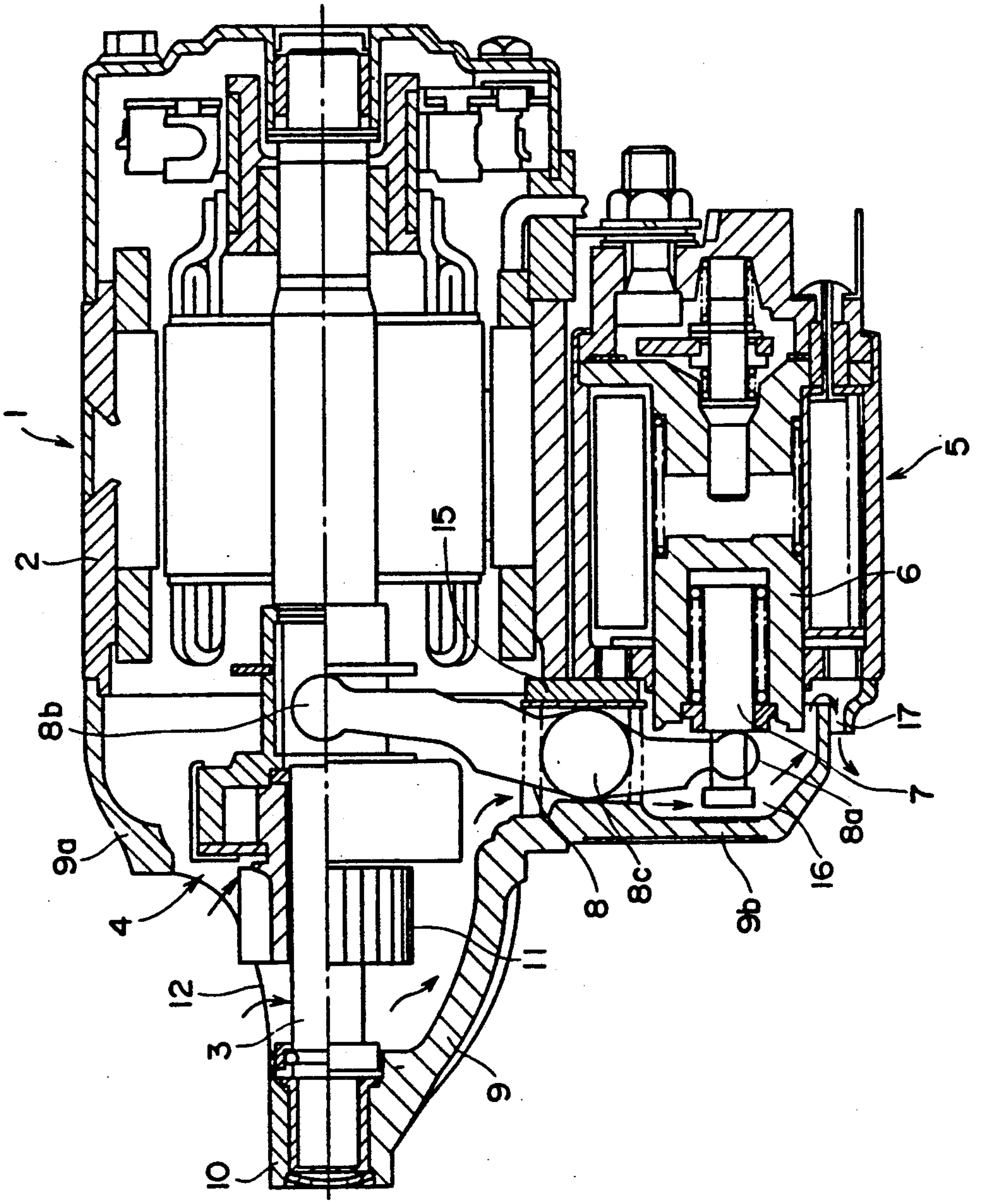
FIG. 1 Prior Art
FIG. 1 is a sectional view illustrating a construction of a conventional starter.
Figure 2:
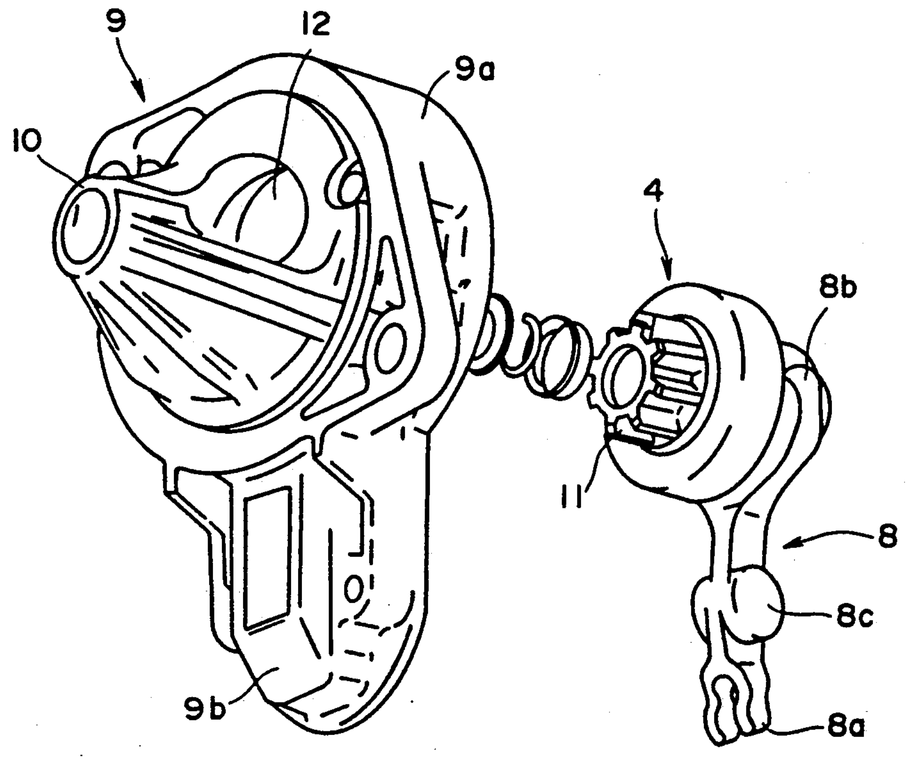
FIG. 2 Prior Art
FIG. 2 is a perspective view illustrating how the parts of one portion of the starter are integrated in the starter.
Figure 3:
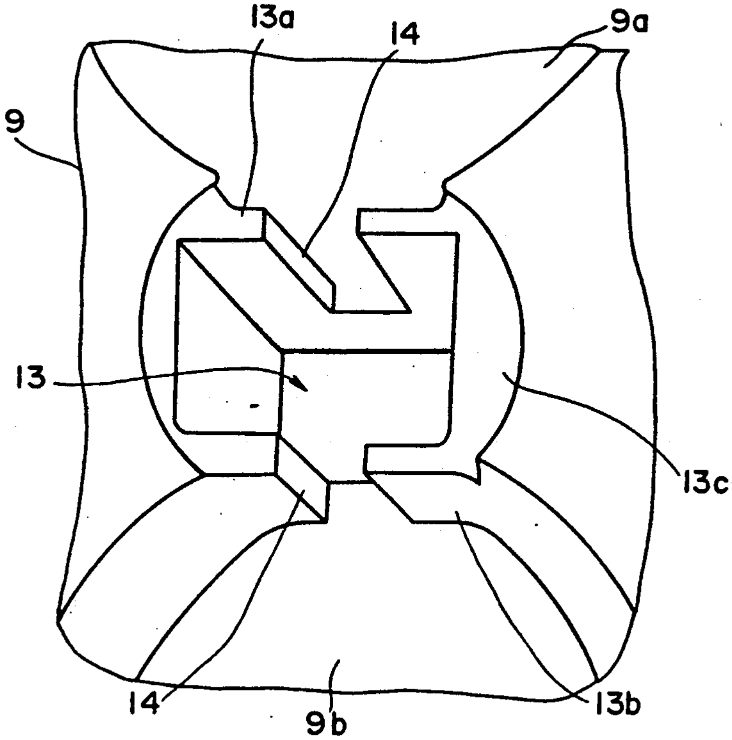
FIG. 3 is a perspective view seen from the inside of the middle portion of a front bracket.

FIG. 3 is a perspective view seen from the inside of the middle portion of the front bracket 9. At a boundary between the cover 9*a* of the upper half and the cover 9*b* of the lower half of the front bracket 9, there is provided a lever box 13 which is surrounded by four walls and which has one open surface facing to the inside of the starter so that it can house the swinging fulcrum 8*c* of the shift lever 8 with the capability of swinging. At the upper wall 13*a* and the lower wall 13*b* of the lever box 13, there are provided two apertures or notches 14 of a size through which both arms of shift lever 8 extending from the swinging fulcrum 8*c* toward their respective directions opposite to each other can pass, respectively. Both of the arms of the shift lever 8 which have passed through the notches 14 go through the cover 9*a* of the upper half and the cover 9*b* of the lower half of the front bracket 9, respectively, and, as has been described above, the upper end 8*b* of the shift lever 8 engages the pinion shifting member 4, and the lower end 8*a* engages a hook 7 of the electro-magnetic switch 5. As a result between the front end of the electro-magnetic switch 5 and the cover 9*b* of the lower half of the front bracket 9, there is produced a space 16 for housing the shift lever 8.

A lever packing or closure member 15 of L-shaped cross section is pressed against the inner open surface 13*c* of the lever box 13 so as to close the lever box 13. The lever packing 15 has a pillar composed of a rubber plate whose inner surface is covered by a steel plate, and the steel plate is pressed against the inner open surface 13*c*. A leg of the lever packing 15 made of rubber plate is placed over the upper wall 13*a* of the lever box 13 so as to cover one end of the notch 14. And even when the waterproofing boot 21 is moved owing to swinging of the shift lever 8 and can not cover the notch 14, the leg of the lever packing 15 can cover it so as to compensate for not covering the notch. Then, the inside of the cover 9*a* of the upper half is always cut off from the inside of the cover 9*b* of the lower half of the front bracket 9. Accordingly, water which has entered from the opening 12 in the upper portion of the front bracket 9 is prevented from going through by the waterproofing boot 21 and is filled in the cover 9*a* of the upper half of the front bracket 9, however, it does not enter into the cover 9*b* of the lower half of the front bracket 9, thereby, the electro-magnetic switch 5 is not filled with the water.

And the water filled in the upper half of the front bracket 9 is gradually drained, through the drain passage 22, to the outside thereof.

In the case where the lever packing 15 is mounted when the starter is assembled, the waterproofing boot 21 together with the shift lever 8 are arranged in their predetermined positions, then the leg of the lever packing 15 is slid under the outer periphery of the waterproofing boot 21, the lever packing 15 being pressed against the inner open surface 13*c* of the lever box 13 while the position of the lever packing 15 to be mounted is adjusted. And at that time, in the case where the leg of the lever packing 15 made of rubber is employed, it may not smoothly slid under the outer periphery of the waterproofing boot 21, resulting in it taking a longer time to mount the lever packing 15 to the starter.

Figure 6:
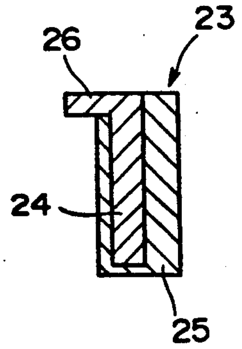
FIG. 6 is a sectional view illustrating another embodiment of a lever packing of the invention.
Figure 7:
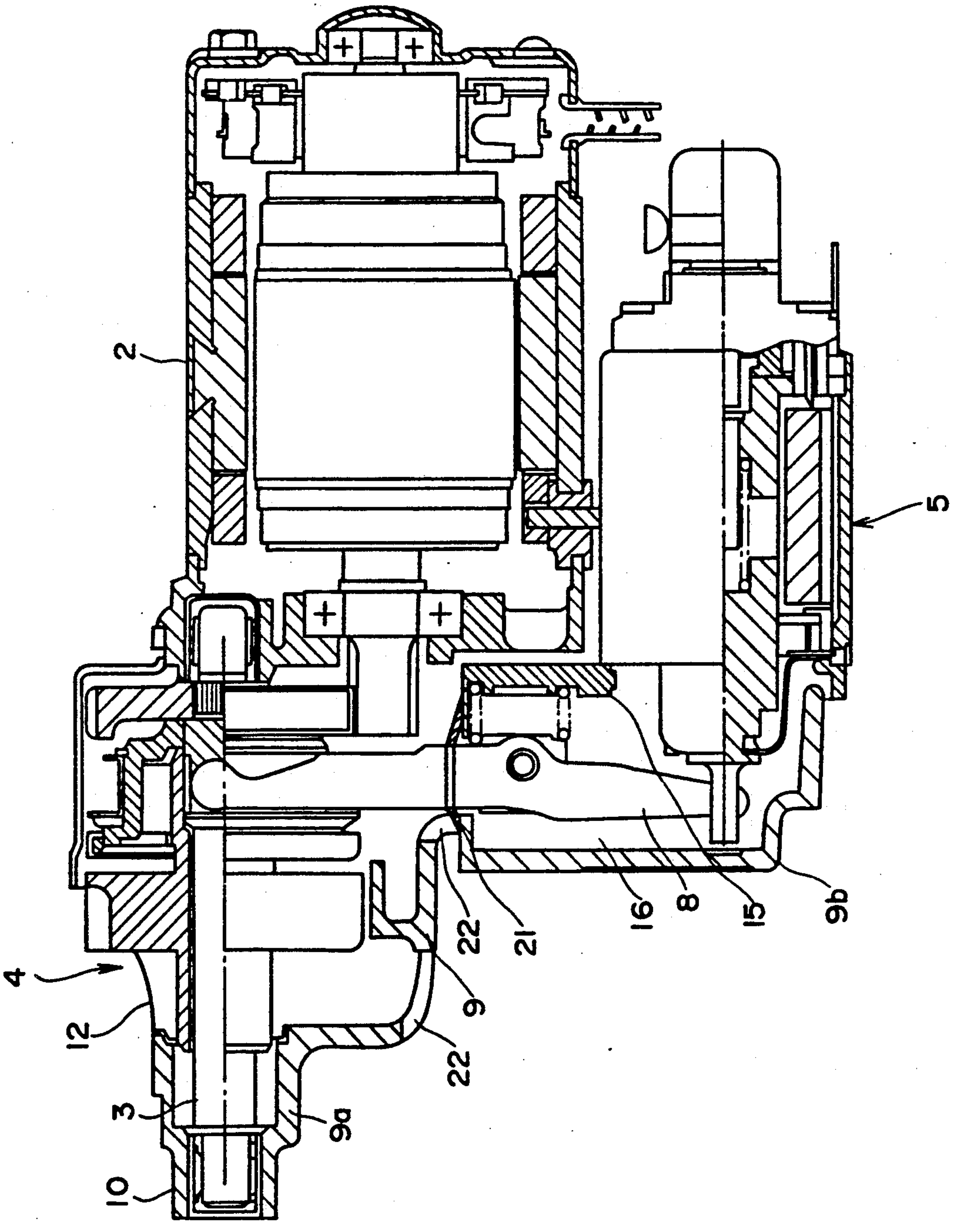
FIG. 7 is a sectional view illustrating a construction of another embodiment of the starter of this invention.

FIG. 6 is a sectional view of a lever packing 23 which can solve the above mentioned problem which the conventional lever packing has when it being mounted to the starter. In the lever packing 23, a pillar portion of a steel plate 24 of L-shaped section is covered with rubber 25, from which a leg 26 made of steel is exposed. Accordingly, the lever packing 23 can more smoothly be slid under the outer periphery of the waterproofing boot 21 than when the leg is made of rubber, and therefore the lever packing 23 can easily be mounted to the starter.

In addition, the mounting of the starter 20 of this embodiment to an engine and a gear box casing is, what is called, the faucet type, however, a starter mounted in the way of, what is called, the setting type will have the same advantages as this embodiment.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A vehicle starter motor assembly, comprising:

(a) a motor (2) having a rotary output shaft (3) extending outwardly from one end thereof, (b) a shifting member (4) including a pinion (11) slidably fitted to the output shaft, (c) an electromagnetic actuator (5) disposed below the motor, (d) a shift lever (8) having an upper end portion engaged with the shifting member and a lower end portion engaged with the actuator, (e) a front housing (9) including an upper portion (9*a*) surrounding the motor and defining an opening (12) for externally exposing the pinion, and a lower portion (9*b*) surrounding the actuator and defining a fulcrum support (13) for pivotally supporting the shift lever at an intermediate position thereof, the fulcrum support defining an aperture (14) through which the upper end portion of the shift lever extends, and (f) an elastic waterproofing boot (21) having a central opening (21*a*) sealingly surrounding the upper end portion of the shift lever and a skirt surrounding the central opening and overlying the fulcrum support aperture to prevent water entering through the pinion exposure opening from reaching the actuator via the fulcrum support.

2. A starter motor assembly as set forth in claim 1, wherein said waterproofing boot is umbrella-shaped.

3. A starter motor assembly as set forth in claim 1, wherein said waterproofing boot is square.

4. A starter motor assembly as set forth in claim 1, further comprising:

an L-shaped closure member (15;23) having a portion underlying the skirt and covering a part of the fulcrum support aperture.

5. A starter motor assembly as set forth in claim 4, wherein said closure member is made of rubber.

6. A starter motor assembly as set forth in claim 4, wherein said closure member is metallic.

7. A starter motor assembly as set forth in claim 2, further comprising a drain passage (22) defined in the lower portion of the housing, proximate the skirt, for discharging water blocked by the waterproofing boot.

* * * * *